United States Patent

Kawanishi et al.

[11] Patent Number: 5,631,056
[45] Date of Patent: May 20, 1997

[54] OPTICAL RECORDING MEDIUM

[75] Inventors: Toshinori Kawanishi, Yokosuka; Mikiya Kuroda, Yokohama, both of Japan

[73] Assignee: Victor Company of Japan, Ltd., Yokohama, Japan

[21] Appl. No.: 413,426

[22] Filed: Mar. 30, 1995

Related U.S. Application Data

[63] Continuation-in-part of Ser. No. 335,905, Nov. 8, 1994.

[30] Foreign Application Priority Data

Mar. 31, 1994 [JP] Japan ................... 6-086038

[51] Int. Cl.$^6$ ........................................ B32B 3/00
[52] U.S. Cl. .................... 428/64.1; 428/64.2; 428/64.4; 428/64.8; 428/913; 430/270.13; 430/945; 430/531; 369/275.1; 369/275.2; 369/283; 369/288
[58] Field of Search ................... 428/64.1, 64.2, 428/64.4, 64.8, 457, 913; 430/270, 495, 945; 369/275.1, 275.2, 283, 288; 470/270.1, 270.11, 270.12, 270.13, 495.1

[56] References Cited

U.S. PATENT DOCUMENTS

| | | | |
|---|---|---|---|
| 5,153,873 | 10/1992 | Spruit et al. | 369/275.2 |
| 5,246,758 | 9/1993 | Matsui | 428/64.1 |
| 5,344,682 | 9/1994 | Mizukuki | 428/64.1 |
| 5,356,685 | 10/1994 | Fleming | 428/64.1 |

FOREIGN PATENT DOCUMENTS

| | | |
|---|---|---|
| H2-96926 | 9/1990 | Japan . |
| H5-12715 | 1/1993 | Japan . |
| H5-28535 | 2/1993 | Japan . |

*Primary Examiner*—Patrick Ryan
*Assistant Examiner*—Elizabeth Evans
*Attorney, Agent, or Firm*—Michael N. Meller

[57] ABSTRACT

There is disclosed an optical recording medium for high density recording without degradation of reproducing output signals. The optical recording medium includes a transparent substrate made of resin having an information recorded portion on which optically readable information signals are recorded, a thermochromic layer provided over the transparent substrate, the thermochromic layer having a larger light transmittance when the thermochromic layer has a higher temperature than a threshold value by absorbing heat off a laser beam spot and the thermochromic layer having a smaller light transmittance when the thermochromic layer has a lower temperature than the threshold value by being cooled down, and a reflecting layer provided on the thermochromic layer, wherein a heat radiating layer made of transparent inorganic material is further provided in contact with the thermochromic layer so as to absorb heat generated in the thermochromic layer by being irradiated with the laser beam spot.

5 Claims, 2 Drawing Sheets

OPTICAL RECORDING MEDIUM

BACKGROUND OF THE INVENTION

1. Field of the Invention

The present invention is a Continuation-In-Part application of U.S. Ser. No. 335,905, filed on Nov. 8, in 1994 and relates to improvements of an optical recording medium used for a high density recording and reproducing apparatus equipped with an optical pickup of a laser beam, and, particularly, relates to an optical recording medium including a thermochromic material having an optical transmittance variable corresponding to a change of temperature due to the laser beam for allowing the optical disc to be effectively performed in the high density recording and reproducing by causing an effective spot diameter of the laser beam to minimize.

2. Description of the Related Arts

Recently, optical recording mediums such as disc, tape and card types are widely used. In these optical recording mediums, a possibility of high density recording has been pursued, especially in optical discs, thus, various kinds of optical discs have been proposed.

Particularly, there arises a demand that high quality digital video information is recorded for two hours on one face of an optical disc having the same diameter as that of audio Compact Discs (referred to as CD), of which a diameter is 12 cm. In order to satisfy the demand above, however, it requires a recording density of 5~10 times as much as that of the audio CD.

Generally, it is possible to obtain a recorded mark smaller than a spot diameter of a laser beam on the optical disc by controlling an intensity of the laser beam. Thus, it is considered that the recording density of the optical disc has no limitation in principle. However, the spot diameter obtained by using a lens system has a serious limitation determined by focusing characteristics of the lens system. Thus, the possibility of the high recording density of the optical disc depends on how to minimize the spot diameter of the laser beam used for reproduction.

Generally, a reproducible repetitive wavelength obtained from the recorded marks is given by a formula of $\lambda/2NA$, wherein "$\lambda$" designates a wavelength of a light to be used and "NA" a numerical aperture of a lens.

As seen from the formula of $\lambda/2NA$, in order to discriminate and reproduce the shortest wavelength from the recorded marks, it is effective to employ a read light having a shorter wavelength and/or a lens having a larger numerical aperture. Thus, recently, studies for shortening the wavelength of the irradiating laser beam and for obtaining a lens having a larger numerical aperture are performed actively.

For example, there has been proposed a technique for deriving a light having a wavelength of 400 nm from an SHG (second harmonic generation) light having a wavelength of 800 nm by employing a non-linear optical element as a source of the laser beam having the shot wavelength. However, the technique has not attained to a practical level yet, considering every aspect of transformation efficiency, cost or stability. Thus, it is considered that the shortest wavelength off semiconductor practically used as a light source is limited to 670 nm at most.

Further, the largest numerical aperture of the lens capable of being installed into optical reproducing apparatuses is considered to be limited to 0.6 at most, taking account of a focal length of the lens or severe physical accuracies (thickness, warp and run-out) required for the disc.

Therefore, though the lens having the numerical aperture of 0.6 together with the semiconductor laser emitting the wavelength of 670 nm as the light source is employed in the optical disc, apparatus, an obtainable recording density is at most 2.5 times as much as that of the CD. Thus, the demand mentioned above can not be met.

As a countermeasure thereof, there has been proposed a high density recording and reproducing method employing an optical disc provided with an optical masking layer made of a variable optical transmittance material (referred to as a thermochromic material hereinafter) which maintains opaque in a lower temperature or the room temperature. The optical transmittance of the thermochromic material increases at a higher temperature by being irradiated with the laser beam and decreases at a lower temperature by being cooled in the atmosphere.

An optical intensity distribution of the laser beam used for the information recording and reproducing generally shows the Gaussian distribution. When such a laser beam is irradiated on the above-mentioned thermochromic material, the thermochromic material renders transparency at only a portion which is irradiated by a center portion of a laser beam spot having a stronger intensity or a higher temperature than that of a peripheral portion of the laser beam. Thus, a masking effect occurs to prevent the laser beam from passing through except for the center portion because other portions except for the center portion thereof maintain opaque, which allows a detection of a recorded mark having a smaller diameter than an actual spot diameter of the laser beam.

However, the thermochromic material, which changes its optical transmittance in accordance with a change of temperature as mentioned in the foregoing, has a problem concerning time intervals during a reversible change of the optical transmittance thereof, i.e., a first time interval required for changing from a smaller optical transmittance state to a larger optical transmittance state caused by a temperature rise due to absorbing a quantity of heat, and a second time interval required for changing from the larger optical transmittance state to the smaller optical transmittance state caused by lowered temperature due to being cooled down. Needless to say, the shorter each of the time intervals becomes, the more effective the masking effect becomes. However, almost all the optical transmittance materials do not give a satisfactory result so far at the rotational speed of the CD.

Especially, in the second time interval mentioned above, a longer time interval causes a temperature rise of the thermochromic material because the thermochromic material heated by the laser beam is heated again due to the fact that the same track is continuously irradiated by a reading laser beam in the reproduction of the optical disc where an adequate time for cool down is not provided. As a result, a larger quantity of heat is accumulated in the thermochromic layer. This causes the area having a higher temperature to spread into the thermochromic layer, resulting in eliminating an effect of reducing an effective spot diameter of the laser beam spot.

Specifically, when recorded tracks formed on the optical disc are scanned by being irradiated with a laser beam, a portion having a larger optical transmittance by being irradiated with the laser beam streaks backward from a position of the laser beam spot irradiated thereon to have a shape like a comet. This reason is considered that an quantity of heat is locally accumulated in the thermochromic material because of its small thermal conductivity. As a result, the area with higher temperature extends in the thermochromic material because of an increase of quantity of heat accumulated therein, especially, upon time still image reproducing operation. The increase of the quantity of heat degrades the adequate masking effect of the thermochromic material.

SUMMARY OF THE INVENTION

Accordingly, a general object of the present invention is to provide a novel and useful optical recording medium in which the above disadvantage has been eliminated.

A more specific object of the present invention is to provide an optical recording medium without degradation of reproduced signals especially in a still image reproducing operation by employing a heat radiating layer adjacent to a thermochromic material layer provided on the optical disc.

Another specific object of the present invention is to provide an optical recording medium comprising a transparent substrate made of resin having an information recorded portion on which optically readable information signals are recorded, a thermochromic layer provided over the transparent substrate, the thermochromic layer having a larger light transmittance when the thermochromic layer has a higher temperature than a threshold value by absorbing heat of a laser beam spot and the thermochromic layer having a smaller light transmittance when the thermochromic layer has a lower temperature than the threshold value by being cooled down, and a reflecting layer provided on the thermochromic layer, wherein a heat radiating layer made of transparent inorganic material is further provided in contact with the thermochromic layer so as to absorb heat generated in the thermochromic layer by being irradiated with the laser beam spot.

Another specific object of the present invention is to provide an optical recording medium comprising, a transparent substrate made of resin having guide grooves, a thermochromic layer provided over the transparent substrate, the thermochromic layer having a larger light transmittance when the thermochromic layer has a higher temperature than a threshold value by absorbing heat of a laser beam spot and the thermochromic layer having a smaller light transmittance when the thermochromic layer has a lower temperature than the threshold value by being cooled down, an information recording layer on which optically readable information signals are to be recorded, the information recording layer being provided on the thermochromic layer, a reflecting layer provided on the information recording layer, wherein a heat radiating layer made of transparent inorganic material is further provided in contact with the thermochromic layer so as to absorb heat generated in the thermochromic layer by being irradiated with the laser beam spot.

DETAILED DESCRIPTION OF THE PREFERRED EMBODIMENTS

At present, most of widely-used optical discs employ a substrate made of a resin. It is considered that the resin will be also employed for a substrate of a high density recording optical disc which is expected to be realized in future taking account of its mass-productivity and its production cost. The resin mentioned above generally has a high thermal insulation property. Thus, the resin prevents dispersing of heat generated in the thermochromic layer due to absorbing heat energy of the laser beam.

Further, at present, almost of all the optical discs have a reflection type structure provided with a metal reflecting layer. Generally, this metal reflecting layer has a larger heat conductivity. This causes the heat locally accumulated in the thermochromic layer to disperse. In connection with the fact of the heat dispersing, the inventors have discovered that, on the contrary, the metal reflecting layer causes an area accumulated with the heat to spread, which degrades the masking effect of the thermochromic layer because the metal reflecting layer has too large heat conductivity.

Therefore, in the optical recording disc of the present invention, a heat radiating layer made of an inorganic material having transparency is formed contiguous to the thermochromic layer in the optical recording layer. The inorganic material has a thermal conductivity larger than those of the thermochromic layer and the substrate made of the resin and smaller than that of the metal reflecting layer. Thus, the heat absorbed by the thermochromic layer is radiated to the heat radiating layer and also to the metal reflecting layer through the heat radiating layer. Therefore, the heat is prevented from being accumulated locally in the thermochromic layer, so that it is possible to shorten a cooling time of a part maintaining a higher temperature in the thermochromic layer even after the scanning laser spot is off. In other words, it is possible to make an interval of a time shorter for the thermochromic layer to return to a state having a small optical transmittance as it was.

Particularly, it is effective to reduce the thermal insulation effect due to the substrate made of resin by forming the heat radiating layer interposed between the resin substrate and the thermochromic layer.

As will be seen from the experimental result mentioned hereinafter, good results are obtained in both cases, i.e., in a case where a pair of heat radiating layers are provided to sandwich the thermochromic layer in the optical disc and in another case where only one heat radiating layer is provided between the resin substrate and the thermochromic layer.

A description is given of embodiments of the present invention referring to accompanying drawings.

Figure 1:
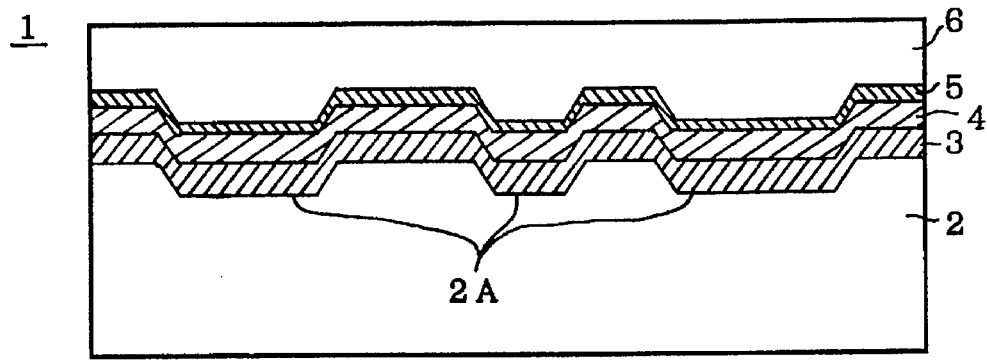
FIG. 1(A) is a sectional view of a reproducing optical disc; of an embodiment according to the present invention cut along a recorded track of the optical disc.
FIG. 1(B) is a sectional view of a recordable optical disc of an embodiment according to the present invention cut along a diameter of the optical disc.
Figure 1:
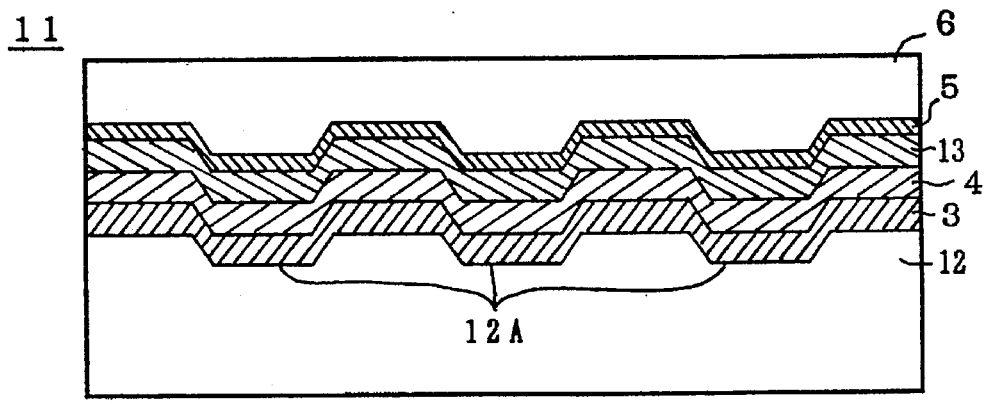

FIG. 1(A) is a sectional view of a reproducing optical disc of an embodiment according to the present invention cut along a recorded track and FIG. 1(B) is a sectional view of a recordable optical disc of an embodiment according to the present invention cut along a diameter thereof.

Referring to FIG. 1(A), a reproducing optical disc 1 of an embodiment according to the present invention comprises a transparent substrate (referred to as a substrate) 2 on which information pits 2A readable with a laser beam are formed, a heat radiating layer 3, a thermochromic layer 4, a reflecting layer 5 and a protecting layer 6 in this order.

Referring to FIG. 1(B), a recordable optical disc 11 of an embodiment according to the present invention comprises a transparent substrate (referred to as a substrate) 12 on which guide grooves 12A are concentrically or spirally formed, a heat radiating layer 3, a thermochromic layer 4, an information recording layer 13 made of a recordable and reproducible material, the reflecting layer 5 and the protecting layer 6 stacked in this order.

As a transparent resin used for the substrates 2, 12, it is possible to employ materials used in ordinary optical disc such as polycarbonate, ester methacrylate resin, and epoxy resin.

There is not a limitation as to the forming method of the information pits 2A and the guide grooves 12A. These information pits 2A and the guide grooves 12A are formed by well known method.

As a material used in the above heat radiating layer 3, it is preferable to select one from a group of inorganic materials such as metal oxide, nonmetalic oxide, metal halide, metal sulfide, and metal nitride.

Specifically, silicon oxide, silicon dioxide, cerium oxide, magnesium fluoride, cerium fluoride, neodymium fluoride, zinc sulfide, germanium sulfide, silicon nitride, tantalum nitride, and $NaAlF_6$ are available for the purpose.

As other materials than the above ones used in the heat radiating layer 3, it is possible to employ a material having transparency and a larger thermal conductivity than those of the substrates 2 and 12 made of resin. In that case, this material can act as the heat radiating layer 3 for the thermochromic layer 4.

When a thickness of the heat radiating layer 3 is too thin, the heat radiating layer 3 can not present the radiating effect. On the contrary, when the thickness thereof is too thick, the optical disc 1 (11) requires larger intensity of the laser beam, thus a reduction of sensitivity is expected.

Further, upon forming the heat radiating layer 3, if a stable quality of the heat radiating layer 3 can not be obtained, cracks may develop in the heat radiating layer 3 in the worst case.

According to the experiments performed by the inventor, a good result is obtained when the thickness of the heat radiating layer 3 is made in a range of 5 to 100 nm, though the optimum range may be different in accordance with materials of the heat radiating layer 3. This heat radiating layer 3 is formed to a thickness of 5~100 nm.

In the optical discs 1 and 11 shown in FIGS. 1(A) and 1(B), the heat radiating layer 3 is only provided between the substrate 2 and the thermochromic layer 4, however, for instance, in FIG. 1(A) it is possible to provide another heat radiating layer 3 between the thermochromic layer 4 and the reflecting layer 5 in such a manner that the thermochromic layer 4 is sandwiched between the heat radiating layer 3 and another heat radiating layer 3.

Figure 2:
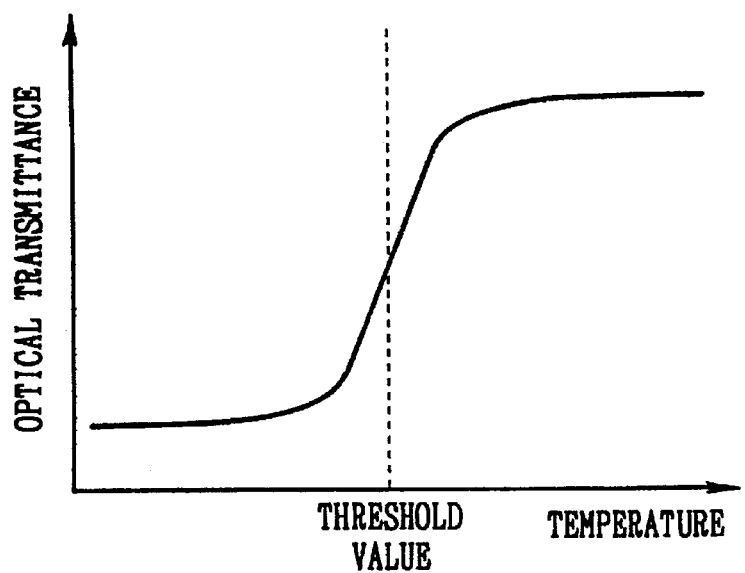
FIG. 2 is a graph showing a temperature dependence characteristic of a light transmittance of the thermochromic layer shown in FIGS. 1(A) and 1(B)

The above thermochromic layer 4 has an optical transmittance characteristic as shown in FIG. 2.

FIG. 2 is a graph showing a temperature dependence characteristic of a light transmittance of the thermochromic layer shown in FIGS. 1(A) and 1(B).

Specifically, referring to FIG. 2, the thermochromic layer 4 has a property that the thermochromic layer 4 absorbs a light having a wavelength used in optical recording and reproducing at a lower temperature than a threshold value of temperature due to decrease of the optical transmittance, wherein the thermochromic layer 4 allows the light to pass through at a higher temperature than the threshold value because of an increase of the optical transmittance. After that, when the thermochromic layer 4 is cooled down at a lower temperature than the threshold value, the optical transmittance thereof is decreased and returns to the smaller value as it was. Thus, it is possible to decrease an effective diameter of a light spot irradiated with the laser beam because an area heated at a higher temperature than the threshold value has a larger optical transmittance, while the other area except for the above area maintains a smaller light transmittance, resulting in absorbing the light and preventing the light from passing through the thermochromic layer.

Any kinds of materials having the property mentioned above can be employed as the material of the thermochromic layer 4. For example, a mixture of electron donative color compound and electron acceptant developer, and a mixture of polarized compound (or electron donative color compound) and phenol type developer are available for the purpose.

Specifically, as to the electron donative color compound there are fluoran type compound, spiropirane type compound, phtalid type compound, and lactam type compound.

The reflecting layer 5 is made of a metal or a metal compound such as gold or aluminum which are widely used in the optical disc.

The protecting layer 6 provided on the reflecting layer 5 is easily formed by coating an ultraviolet ray curing resin using a spin-coat method or a vapor deposition method.

The information recording layer 13 provided on the recordable optical disc 11 is formed by coating well known optical recording material using the spin-coat method or the vapor deposition method. Various kinds of materials such as phase-change type material and a magneto-optical material are available for the information recording layer 13.

Next, a description is given to embodiments 1-1~1-5 and comparatives 1-6~1-8 which were fabricated as reproducible optical discs so as to be evaluated.

EMBODIMENT 1

The optical disc 1-1 fabricated as an embodiment 1 has the substrate 2 made of polycarbonate. The information pits 2A are formed on the substrate 2 by using injection mold method so as to have a recording density of 4 times as much as that of the CD. On the substrate 2, the heat radiating layer 3 is formed with a thickness of 30 nm by depositting $MgF_2$ layer as the inorganic material layer using vacuum deposition method. The thermochromic layer 4 is formed on the heat radiating layer 3 with a thickness of 120 nm by using the vacuum deposition method in such a manner that a ratio of GN-169 (made by Yamamoto Chemical Co. Ltd.) as the electron donative color compound to bisphenol as the developer is to be 1:2 on a monitor. The reflecting layer 5 is formed to a thickness of 70 nm on the thermochromic layer 4 by depositting aluminum using the vacuum deposition method. The protecting layer 6 is formed to a thickness of about 7 μm on the reflecting layer 5 by coating ultraviolet ray curing resin SD-17 (Dainippon Ink Go. Ltd.).

EMBODIMENT 2

In the optical disc 1-2 fabricated as an embodiment 2, it has the same structure as that of the embodiment 1 except for the heat radiating layer 3, wherein the heat radiating layer 3 is formed to a thickness of 80 nm. Thus, a detailed description is omitted here.

EMBODIMENT 3

In the optical disc 1-3 fabricated as an embodiment 3, it has the same structure as that of the embodiment 1 except for the heat radiating layer 3, wherein the heat radiating layer 3 is formed to a thickness of 50 nm of ZnS.

EMBODIMENT 4

In the optical disc 1-4 fabricated as an embodiment 4, it has the same structure as that of the embodiment 1 except for the heat radiating layer 3, wherein the heat radiating layer 3 is formed to a thickness of 40 nm of $SiO_2$.

EMBODIMENT 5

In the optical disc 1-5 fabricated as an embodiment 5, it has the same structure as that of the embodiment 1 except for an addition of another heat radiating layer 3, wherein the another heat radiating layer 3 is formed to a thickness of 30 nm between the thermochromic layer 4 and the reflecting layer 5 by depositting $FMg_2$ using the vacuum deposition method. Thus, the thermochromic layer 4 is interposed between the heat radiating layers 3, 3.

COMPARATIVE 1

In the optical disc 1-6 fabricated as a comparative 1, it has the same structure as that of the embodiment 1 except for the heat radiating layer 3, which is not provided therein.

COMPARATIVE 2

In the optical disc 1-7 fabricated as a comparative 2, it has the same structure as that of the embodiment 1 except for the heat radiating layer 3, wherein the heat radiating layer 3 is formed to a thickness of 120 nm.

COMPARATIVE 3

In the optical disc 1-8 fabricated as a comparative 3, it has the same structure as that of the comparative 2 except for the heat radiating layer 3, wherein the heat radiating layer 3 is formed to a thickness of 8 nm.

The evaluation tests were preformed by mounting the optical discs 1-1~1-8 mentioned above in the reproducing apparatus equipped with a semiconductor laser which emits a laser beam having a wavelength of 690 nm.

The reproducing condition of the reproducing apparatus is as follows:

constant linear velocity (CLV); 3 m/s number of revolution; 1,000 rpm reproducing power; 1.4 mw A reproducing signal amplitude ratio of the shortest pit to that of the longest pit was measured for 5 minutes under the still image reproducing operation to evaluate the reproducing characteristics of the discs 1-1~1-8. The results are shown in Table 1.

TABLE 1

| disc No. | a structure of an optical disc (numeral in brackets denotes the thickness of respective layers in μm) | amp. ratio (%) norm. rep. | amp. ratio (%) still rep. (5 minutes) |
| --- | --- | --- | --- |
| emb. 1 No. 1-1 | subst.→$MgF_2$→thermo.→ref. (30) (120) | 77.2 | 59.6 |
| emb. 2 No. 1-2 | subst.→$MgF_2$→thermo.→ref. (80) (120) | 80.0 | 69.8 |
| emb. 3 No. 1-3 | subst.→ZnS→thermo.→ref. (50) (120) | 85.2 | 51.2 |
| emb. 4 No. 1-4 | subst.→$SiO_2$→thermo.→ref. (40) (120) | 83.4 | 62.2 |
| emb. 5 No. 1-5 | subst.→$MgF_2$→thermo.→$MgF_2$→ref. (30) (120) (30) | 76.0 | 58.4 |
| com. 1 No. 1-6 | subst.→thermo.→ref. (120) | 81.1 | 39.6 |
| com. 2 No. 1-7 | subst.→$MgF_2$→thermo.→ref. (120) (80) | 47.0 | 40.0 |
| com. 3 No. 1-8 | subst.→$MgF_2$→thermo.→ref. (3) (80) | 70.0 | 44.4 |

Note:
subst.: a substrate
$MgF_2$, ZnS, and $SiO_2$: materials used for a heat radiating layer
thermo.: a thermochromic layer
ref.: a reflecting layer
amp. ratio (%): a reproducing signal amplitude ratio
norm. rep.: a normal reproduction
still rep.: a still image reproduction As seen from Table 1, the optical recording discs 1-1~1-5 of the embodiments 1~5 showed reproducing signal amplitude ratios of 75~84% upon a normal reproducing (a continuous reproducing). Further, they also showed good results of reproducing signal amplitude ratios of 50~70% upon a still image reproduction for 5 minute. Thus, it will be understood that the heat radiating layer 3 is very effective to radiate the heat accumulated in the thermochromic layer 4 so that the thermochromic layer 4 exerts a sufficient masking effect to obtain good reproducing characteristics.

On the other hand, in the optical recording discs 1-6~1-8 of the comparatives 1~3, the reproducing signal amplitude ratios thereof decreased to about 40% upon the still image reproduction for 5 minutes. Thus, it will be understood that the thermochromic layer 4 can not exert a sufficient masking effect by causing the effective diameter of the laser beam spot to decrease, so that a good frequency characteristic can not be expected.

Further, the heat radiating layer 3 of the optical disc 1-7 of the comparative 2 is too thick, so that the heat generated by the laser beam is excessively radiated, thus the masking effect of the thermochromic layer 4 can not be effectively exerted. As a result, the amplitude ratio thereof is degraded in the successive normal reproducing. Further, the heat radiating layer 3 of the optical disc 1-8 of the comparative 3 is too thin, so that the radiating effect due to the heat radiating layer 3 is degraded in the still image reproduction. Though the amplitude ratio of the optical disc 1-8 after 5-minute still image reproduction is slightly better compared with that of the optical disc 1-6 which is not provided with the heat radiating layer 3, but the amplitude ratio thereof is not acceptable.

Figure 3:
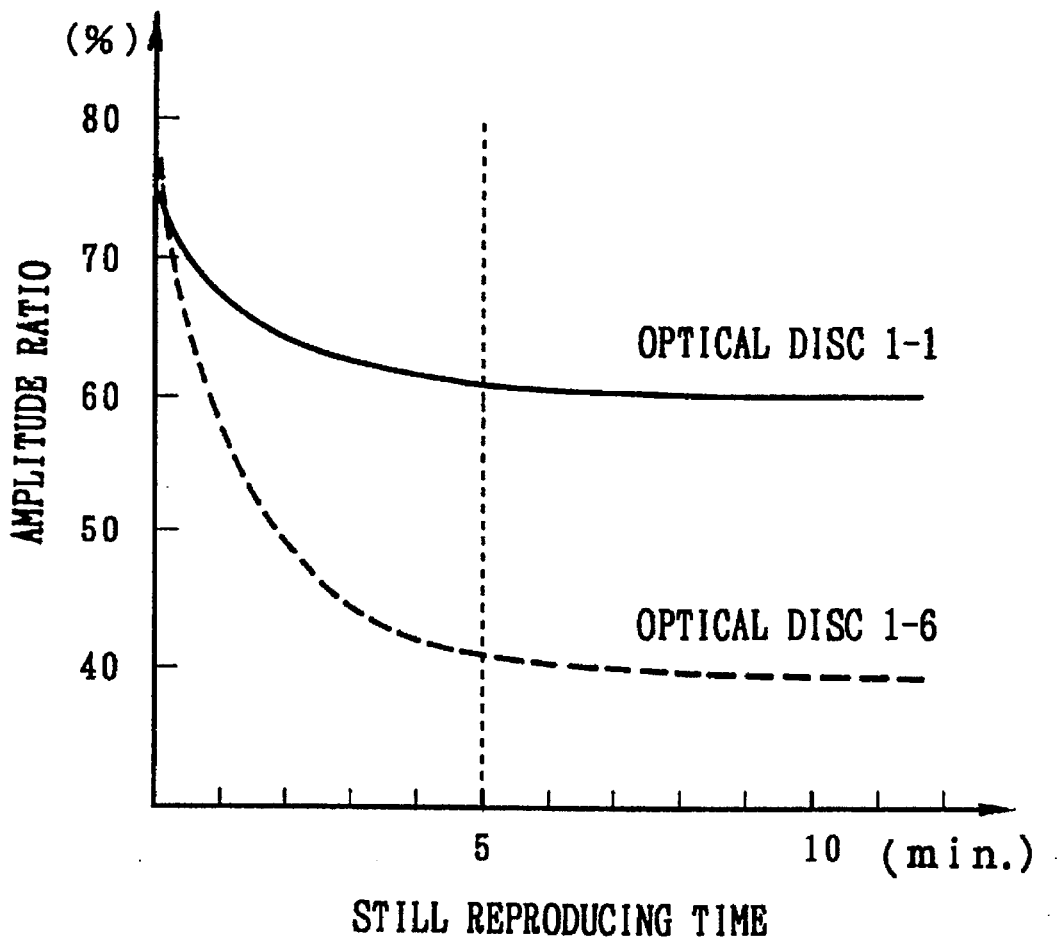
FIG. 3 is a graph showing an example of a still image response characteristic of the masking layer in the present invention.

FIG. 3 is a graph showing relations between a still image reproducing time and an amplitude ratio of the optical discs 1-1 (embodiment 1) and 1-6 (comparative 6).

As shown in FIG. 3, the amplitude ratio of the optical disc 1-6 is markedly degraded with lapse of time in the still image reproduction because the masking effect is not sufficiently exerted due to absence of the heat radiating layer 3. This will cause errors in the reproduced signals.

On the other hand, the amplitude ratio of the optical disc; 1-1 is slightly degraded during the 5-minute still image reproduction, however, it will be understood that the degree of the degradation thereof is smaller compared with that of the optical disc 1-6. Further, the masking effect thereof is adequately exerted to maintain the amplitude ratio of the optical disc: 1-6 constant. This allows to construct a simple circuit for compensating the error in the reproduced signals.

According to the optical disc having a thermochromic layer for decreasing an effective diameter of a laser beam spot in the present invention, a heat radiating layer made of a transparent inorganic material is provided contiguous to the thermochromic material for radiating the heat that the thermochromic material has absorbed. This heat radiating layer prevents the heat from being accumulated in the thermochromic layer, resulting in securely obtaining excellent reproduced signals, particularly, in the case of repeatedly reproducing the same track such as in the still image reproduction, because of the masking effect effectively exerted in the masking layer.

Further, the heat radiating layer is provided at least between the thermochromic layer and the substrate resin in the optical disc, of the present invention, thus, it is possible to obtain stable reproduction signals for a prolonged time because the heat radiating layer prevents the thermal insulation effect of the substrate resin to effectively exert the masking effect of the thermochromic layer.

What is claimed is:

1. An optical recording medium comprising:

a transparent substrate made of resin having an information recorded portion;

information pits optically readable with a laser beam spot being formed on said information recorded portion of said transparent substrate;

a thermochromic layer provided over said transparent substrate, said thermochromic layer having a masking effect which provides for a larger light transmittance to allow said laser beam spot to pass therethrough when the thermochromic layer has a higher temperature than a threshold value by absorbing heat of said laser beam spot and wherein said thermochromic layer provides for a smaller light transmittance to prevent said laser beam spot to pass therethrough when the thermochromic layer has a lower temperature than the threshold value by being cooled down, so that a substantial diameter of said laser beam spot is reduced;

a reflecting layer provided on said thermochromic layer, and a heat radiating layer composed of a transparent inorganic material having a thickness of 5 to 100 nm in contact with said thermochromic layer for enhancing said masking effect of said thermochromic layer so as to quickly cool down the temperature of said thermochromic layer by causing said heat radiating layer to absorb heat generated in said thermochromic layer by being irradiated with said laser beam spot.

2. An optical recording medium as claimed in claim 1, wherein said heat radiating layer is interposed between said transparent substrate and said thermochromic layer.

3. An optical recording medium as claimed in claim 1, wherein said transparent inorganic material is selected from a group of inorganic materials of silicon oxide, silicon dioxide, cerium oxide, magnesium fluoride, cerium fluoride, neodymium fluoride, zinc sulfide, germanium sulfide, silicon nitride, tantalum nitride, and $NaAlF_6$.

4. An optical recording medium as claimed in claim 3, wherein said transparent inorganic material is selected from a group of inorganic materials of silicon oxide, silicon dioxide, cerium oxide, magnesium fluoride, cerium fluoride, neodymium fluoride, zinc sulfide, germanium sulfide, silicon nitride, tantalum nitride, and $NaAlF_6$.

5. An optical recording medium comprising:

a transparent substrate made of resin having guide grooves;

a thermochromic layer provided over said transparent substrate, said thermochromic layer having a masking effect for providing a larger light transmittance to allow said laser beam spot to pass therethrough when the thermochromic layer has a higher temperature than a threshold value by absorbing heat of said laser beam spot and for providing a smaller light transmittance to prevent said laser beam spot to pass therethrough when the thermochromic layer has a lower temperature than the threshold value by being cooled down, so that a substantial diameter of said laser beam spot is reduced;

an information recording layer on which optically readable information signals are to be recorded, said information recording layer being provided on said thermochromic layer;

a reflecting layer provided on said thermochromic layer, and a heat radiating layer composed of a transparent inorganic material having a thickness of between 5 to 100 nm and being arranged between said transparent substrate and said thermochromic layer in direct contact with said thermochromic layer for enhancing said masking effect of said thermochromic layer so as to quickly cool down the temperature of said thermochromic layer by causing said heat radiating layer to absorb heat generated in said thermochromic layer by being irradiated with said laser beam spot.

* * * * *